(12) United States Patent
Hursey

(10) Patent No.: US 7,036,147 B1
(45) Date of Patent: Apr. 25, 2006

(54) SYSTEM, METHOD AND COMPUTER PROGRAM PRODUCT FOR ELIMINATING DISK READ TIME DURING VIRUS SCANNING

(75) Inventor: Neil John Hursey, Hertford Heath (GB)

(73) Assignee: McAfee, Inc., Santa Clara, CA (US)

( * ) Notice: Subject to any disclaimer, the term of this patent is extended or adjusted under 35 U.S.C. 154(b) by 875 days.

(21) Appl. No.: 10/028,054

(22) Filed: Dec. 20, 2001

(51) Int. Cl.
*G06F 11/08* (2006.01)

(52) U.S. Cl. ........................................ 726/24; 713/188
(58) Field of Classification Search ................ 726/24; 713/188; 712/200, 188
See application file for complete search history.

(56) References Cited

U.S. PATENT DOCUMENTS

| | | | | | |
|---|---|---|---|---|---|
| 5,257,370 | A | * | 10/1993 | Letwin | 711/113 |
| 5,473,769 | A | * | 12/1995 | Cozza | 714/39 |
| 5,502,815 | A | * | 3/1996 | Cozza | 714/38 |
| 5,577,224 | A | * | 11/1996 | DeWitt et al. | 711/118 |
| 5,893,086 | A | | 4/1999 | Schmuck et al. | 707/1 |
| 6,137,043 | A | | 10/2000 | Rossum | 84/603 |
| 6,763,466 | B1 | * | 7/2004 | Glover | 713/200 |

* cited by examiner

*Primary Examiner*—Kim Vu
*Assistant Examiner*—Thomas Szymanski
(74) *Attorney, Agent, or Firm*—Zilka-Kotab, PC; Christopher J. Hamaty

(57) ABSTRACT

A system, method and computer program product are provided for accelerated scanning. Initially, a file access pattern associated with data is identified. The data is subsequently read based on the file access pattern. A virus scan is then performed on the data.

26 Claims, 4 Drawing Sheets

COMMAND.COM      (size 60000 bytes)
3
0, 10000
10001, 20000
30001, 30000      ← 302

NOTEPAD.EXE
5
0, 2000
66000, 512
2001, 2048
40000, 128
50050, 128      ← 300
                304

Fig. 3

SYSTEM, METHOD AND COMPUTER PROGRAM PRODUCT FOR ELIMINATING DISK READ TIME DURING VIRUS SCANNING

FIELD OF THE INVENTION

The present invention relates to virus scanning and more particularly to reading data from a disk for performing virus scanning.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capacities in order to cause denial of service, and so forth.

Network security risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

As is known in the art, a common method of detecting the foregoing threats is to use a scanning engine to scan for known attacks against computers. These attacks can be identified by their unique "malware signature" which generally consists of a string of binary or text data. Upon the detection of an malware signature by the scanning engine, protective measures can be taken, including: sending alerts; intercepting harmful traffic; or disconnecting users who launch attacks.

Using the foregoing method, the scanner reads data from a disk or any other type memory associated with the computer. Once read, the scanner compares the data against a large number of known malware signatures. If a match is found, the protective measures may be executed.

As the number of known malware signatures increases, the aforementioned comparison step increases accordingly, elongating the scanning process. While the size of the list of malware signatures contributes to the overall delay in the scanning process, no other factor increases such delay as much as the time it takes to read the actual data to be scanned.

In fact, as much as 40% of the time taken to scan data for viruses is due to reading such data from a disk. In prior art systems, disk read performance is usually improved by using a 'disk cache' to store data in fast RAM memory as it is read. The next time the data is required from slower memory, it is often already available in faster RAM memory. Unfortunately, one problem with this technique is that the scanner still has to wait for the data to be read in the first place before it can be placed in the cache.

There is thus a need for a technique of minimizing the delay contributable to reading data from memory during the scanning process.

DISCLOSURE OF THE INVENTION

A system, method and computer program product are provided for accelerated scanning. Initially, a file access pattern associated with data is identified. The data is subsequently read based on the file access pattern. A virus scan is then performed on the data.

In one embodiment, if it is determined that the data does not have the associated file access pattern, the data is read and a file access pattern associated with the file is generated and stored for later use.

In another embodiment, if it is determined that the data does not have the associated file access pattern, the data is read and the virus scan is performed, after which it is determined whether the virus scan was slower than a predetermined amount. The file access pattern is then conditionally generated based on whether the virus scan was slower than a predetermined amount.

As an option, the file access pattern includes a file location. The file access pattern may also include a data amount.

In still another embodiment, the data may be read and scanned by executing a first thread of operation for reading the data and a second thread of operation for scanning the data.

In one aspect of the present embodiment, the first thread of operation includes retrieving the file access pattern, reading the data based on the file access pattern, and caching the data. Further, the second thread of operation may include determining whether the file access pattern is valid, and reading the data from the cache if it is determined that the file access pattern is valid. The second thread of operation may also include determining whether the data is available for being read from the cache, and reading the data if the data is available for being read from the cache.

In still yet another embodiment, it is further determined whether the file access pattern is invalid. The file access pattern may be deleted if the file access pattern is determined to be invalid. The data may also be read and a file access pattern associated with the file be generated, if the file access pattern is deleted.

BRIEF DESCRIPTION OF THE DRAWINGS

FIG. 3 illustrates exemplary file access patterns that may be used for accelerated scanning, in accordance with one embodiment.

DESCRIPTION OF THE PREFERRED EMBODIMENTS

Figure 1:
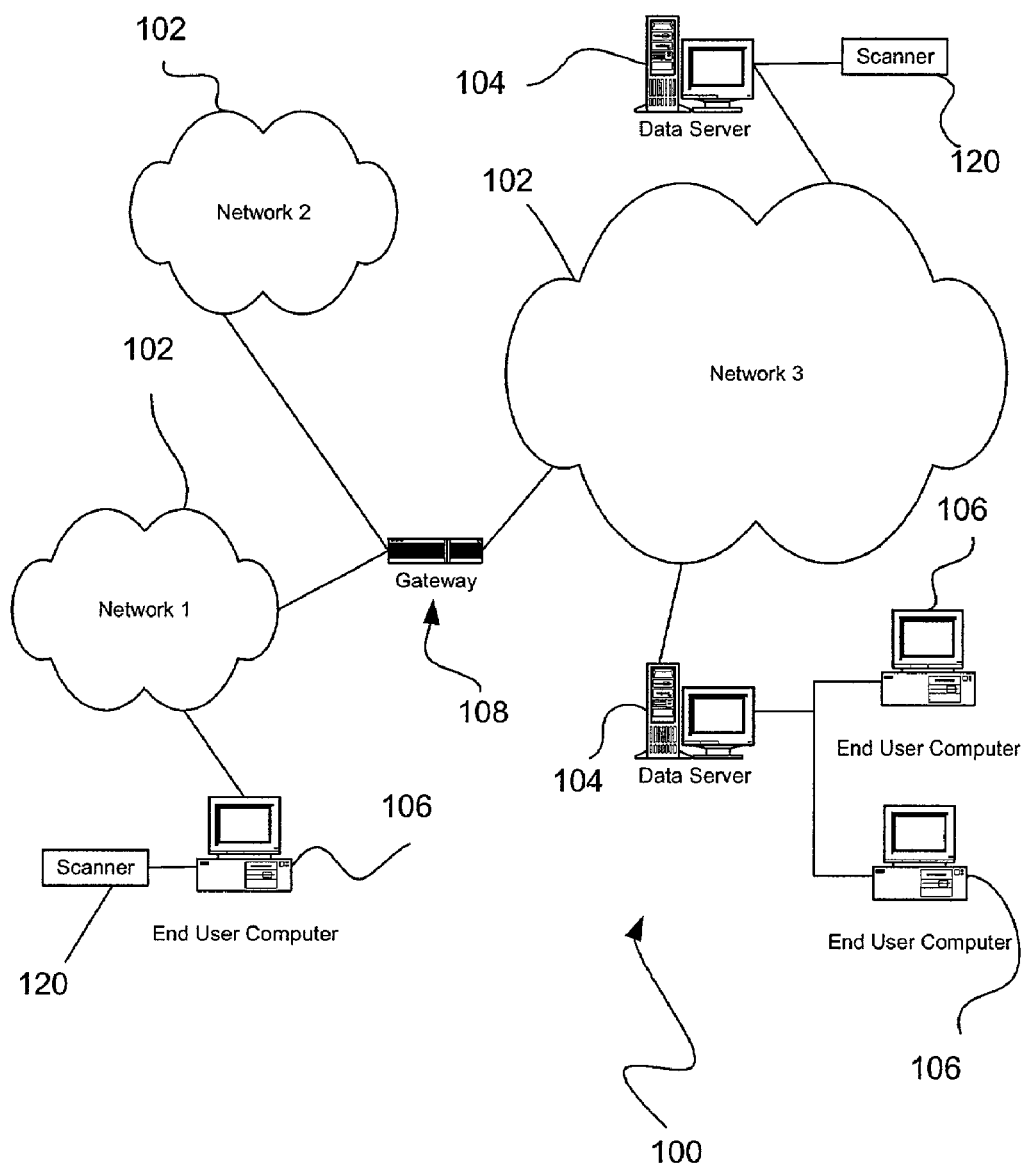
FIG. 1 illustrates a network architecture, in accordance with one embodiment.

FIG. 1 illustrates a network architecture 100, in accordance with the one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

While shown attached to the computers 106 and servers 104, any of the foregoing components and/or segments may be equipped with a scanner 120 including anti-virus scanning software. Such scanner 120 may be adapted for scanning for known types of security events in the form of malicious programs such as viruses, worms, and Trojan horses. Still yet, [0]the scanner 120 may be adapted for content scanning to enforce an organization's operational policies [i.e. detecting harassing or pornographic content, junk e-mails, misinformation (virus hoaxes), etc.]. Of course, the scanner 120 may take any other sort of security measures.

Moreover, the scanner 120 may be adapted for accelerated scanning. Initially, a file access pattern associated with the data is identified. The data is subsequently read based on the file access pattern. A virus scan is then performed on the data in an accelerated manner.

Utilizing the file access pattern, the data may be read before the scanner 120 requires the data for scanning. In other words, the data may be read and scanned by executing a first thread of operation for reading the data and a second thread of operation for scanning the data. Optionally, the data may be cached while the scanner is scanning previous data. Thus, the scanner 120 need not wait for the data when it is time for the scan to take place. More information relating to an exemplary application of the above technique will be set forth hereinafter in greater detail.

Figure 2:
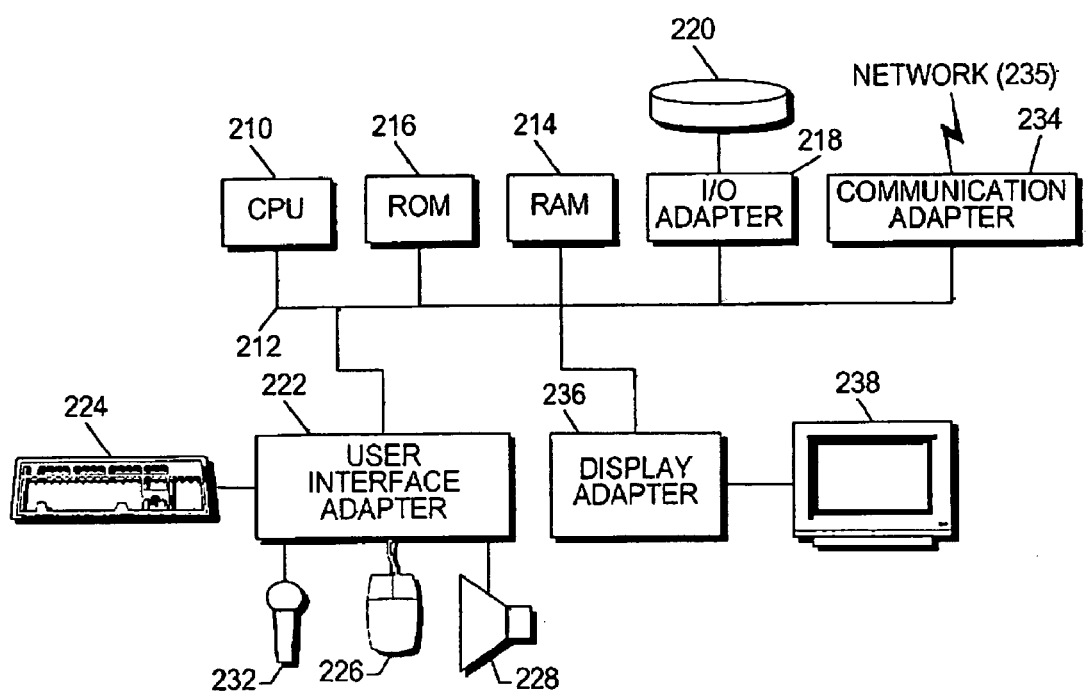
FIG. 2 shows a representative hardware environment that may be associated with the data servers and computers of FIG. 1, in accordance with one embodiment.

FIG. 2 shows a representative hardware environment that may be associated with the data servers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

FIG. 3 illustrates exemplary file access patterns 300 that may be used for accelerated scanning, in accordance with one embodiment. It should be noted that the file access patterns 300 may be stored in a database for many different files. In the context of the present description, a file access pattern includes any information capable of allowing and/or facilitating the scanner to read data associated therewith.

In one exemplary embodiment, each file may be identified either by storing a path and name, or a checksum (i.e. a 32-bit number) of the path and name. Table #1 illustrates the various fields for each entry in the database.

TABLE #1

1) Identification of the applicable file.
2) Number of read accesses made (n)
3) n × Read access patterns.

Table #2 illustrates exemplary contents of each read access pattern.

TABLE #2

1) Location in the file (measured as an offset from the first byte in the file). This may be stored in binary format as an unsigned integer.
2) Amount of data read from the location (measured as number of bytes read). This may be stored in binary format as an unsigned integer.

A first simple example 302 of file access patterns 300 is shown in FIG. 3. As shown, an entire file may be read sequentially in three steps.

A second exemplary entry 304 is also shown in FIG. 3. It should be noted that such data stored may be represented differently for efficiency purposes. Such example shows a file access of NOTEPAD.EXE where 5 read requests are made. The read requests are in the form of <Offset>, <Amount>.

Figure 4:
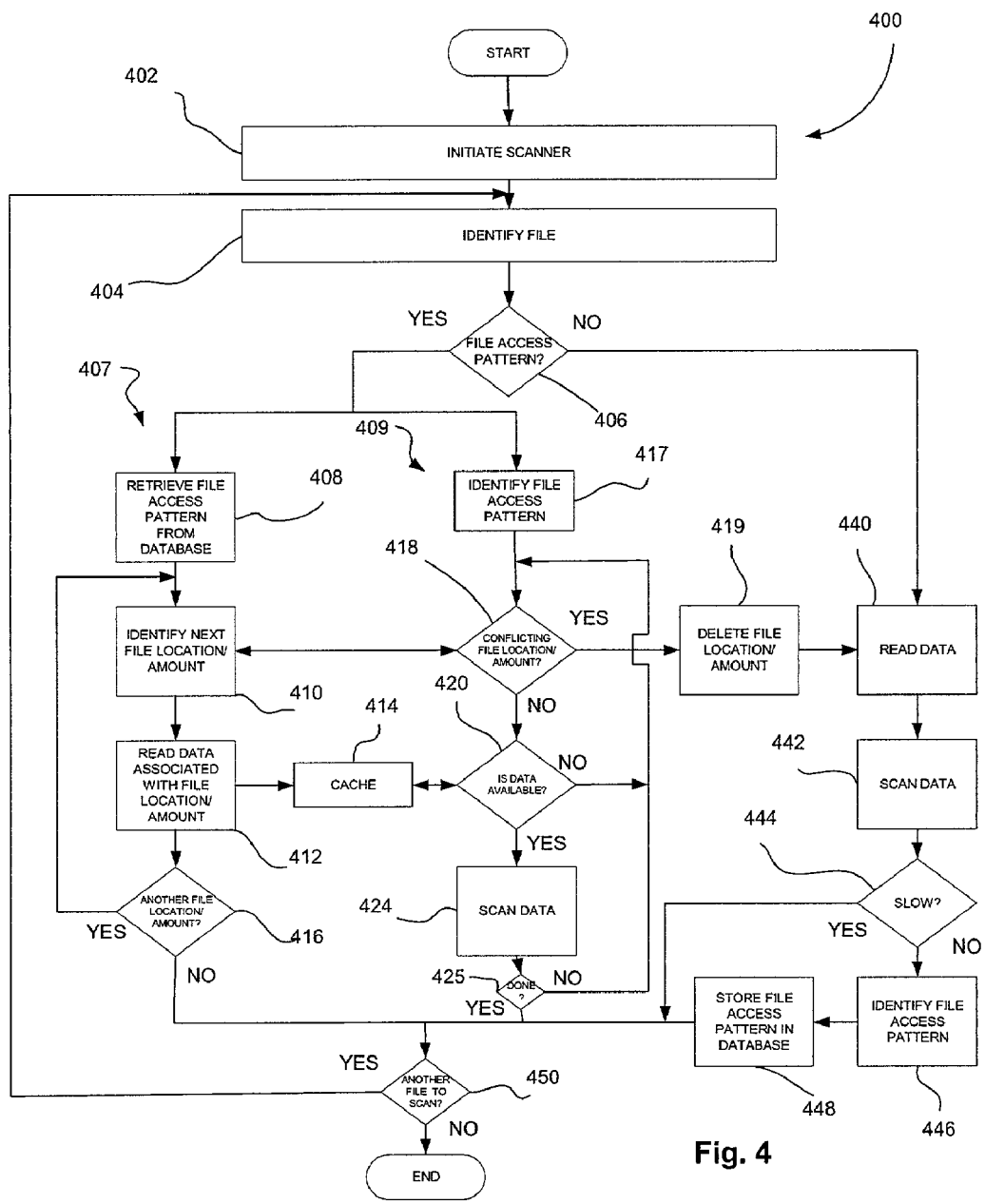
FIG. 4 illustrates a method for accelerated scanning, in accordance with one embodiment.

FIG. 4 illustrates a method 400 for accelerated scanning. In one embodiment, the present method 400 may be used in the context of a scanner like that mentioned hereinabove during reference to FIG. 1. Of course, the present techniques may be utilized in any desired context.

Initially, in operation 402, a scan is initiated. It should be noted that such scan may include an on-access scan, a boot-up scan, comprehensive scan, limited scan, or any other type of desired scan. Initially, a file to be scanned is identified during the scan. See operation 404.

It is then determined whether the file has a file access pattern associated therewith in decision 406. If so, a pair of threads is executed in parallel, including a first thread of operation 407 for reading the data and a second thread of operation 409 for scanning the data.

Execution of the first thread of operation 407 is initiated by retrieving the file access pattern in operation 408. It should be noted that the file access pattern may be stored in a database, with the file, or in any desired manner or location. Next, in operation 410, a file location and a data amount associated with the file access pattern are identified. See FIG. 3.

In operation 412, data is read from the file utilizing the identified file location and data amount. For reasons that will be set forth hereinafter in greater detail, the data is stored in a cache 414 which may take the form of a RAM or any other type of fast memory. Operations 410–412 are then repeated for every file location/amount associated with the file access pattern.

Operating in parallel with the first thread of operation 407 is the second thread of operation 409. As shown in FIG. 4, the second thread of operation 409 begins by identifying the file access pattern associated with the current file. This is done so that the current file locations and amounts associated may be compared against those retrieved in operation 408. See decision 418.

This comparison is carried out to determine whether the file has changed in any manner. It should be noted that a change in the file access pattern renders the second thread of operation 409 useless. Thus, if a conflict is identified in decision 418, the file location and amount associated with the file access pattern are deleted in operation 419, and the first thread of operation 407 is ceased. In other words, the file is treated as if it had no associated file access pattern. In use, the decision 418 may be performed every time the operation 410 is performed.

In use, the cache is constantly monitored to determine in decision 420 whether the data is available. As data becomes available, it is scanned in operation 424 until all of the data is done, as determined by decision 425. It should be noted that the scanning may include comparing the data against malware signatures, decoding the data, or any other techniques that facilitate the detection of viruses or other undesired material. By this design, the scanning operation 424 need not wait until the data is read before scanning can begin. Instead, the first thread of operation 407 may utilize the file access pattern to make the data instantly ready for scanning in the cache 414. Further, the scanned data may also be stored in cache for allowing an application to access the same at a faster rate.

If it is determined that the file does not have the associated file access pattern in decision 406 or the operation is ceased in accordance with decision 418, data is conventionally read from the file in operation 440 after which it is scanned in operation 442. Next, it is determined whether the virus scan was slower than a predetermined amount. If so, it is decided in decision 444 to save space in the file access pattern database, by not storing a file access pattern associated with the file in operations 446 and 448.

If, however, it is determined in decision 444 that the virus scan was not slower than a predetermined amount, it is decided that the first and second threads of operation would speed up the process, and operations 446 and 448 are carried out.

Operation 448 may be optimized so that only a minimum amount of necessary data is stored, while still allowing fast access. This may be achieved using various techniques. See Table #2.

TABLE #2

1) When a scanner is initialized (normally on resetting or powering on the PC) the database may be read from disk, decompressed and stored in RAM (where there is available RAM).
2) During the scanning process, the database in RAM may be modified with new file access patterns. Accessing the database in RAM may be faster than retrieval from disk.
3) On shutdown of the scanning process (normally on power off or reset, or finishing the scan), the database in RAM may be compressed and written to a disk file for persistent storage.
4) The individual file access patterns may be stored in an efficient binary format native to the associated computer. A binary format uses less space and is faster to process than a human-readable text string.

Thus, the present scanner is adapted for reading the data from disk, optical storage, tape storage, or the like into cache before it is requested by the scanner. To accomplish this, the scanner simply records the areas of the file that are accessed (i.e. the file access pattern). Next time a virus scan is performed, the file is looked up and the scanner can read ahead the correct data without waiting to be asked by the scanner. This removes a large amount of the delay associated with scanning.

As an option, the foregoing benefits may be afforded to a new computer by simply running the scan once prior to shipping. This effectively produces the file access patterns that may be used when the user first uses the computer.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for accelerated scanning, comprising:
   (a) identifying a file access pattern associated with data;
   (b) reading the data based on the file access pattern; and
   (c) performing a virus scan on the data;
   wherein the data is read and scanned by executing a first thread of operation for reading the data and a second thread of operation for scanning the data;
   wherein the first thread of operation is executed in parallel with the second thread such that, while a first portion of the data is being scanned, a second portion of the data to be scanned is being read and cached, so that, when a scanner is available for scanning the second portion of the data, a delay associated with reading the second portion of the data is avoided;
   wherein if it is determined that the data does not have the associated file access pattern, the data is read and the virus scan is performed, after which it is determined whether the virus scan was slower than a predetermined amount;
   wherein the file access pattern is conditionally generated based on whether the virus scan was slower than the predetermined amount;
   wherein the file access pattern is not generated if the virus scan was slower than the predetermined amount in order to save space in a file access pattern database.

2. The method as recited in claim 1, wherein if it is determined that the data does not have the associated file access pattern, the data is read and a file access pattern associated with the file is generated and stored.

3. The method as recited in claim 1, wherein the file access pattern includes a file location.

4. The method as recited in claim 1, wherein the file access pattern includes a data amount.

5. The method as recited in claim 1, wherein the first thread of operation includes retrieving the file access pattern, reading the data based on the file access pattern, and caching the data.

6. The method as recited in claim 5, wherein the second thread of operation includes determining whether the file access pattern is valid, and reading the data from the cache if it is determined that the file access pattern is valid.

7. The method as recited in claim 5, wherein the second thread of operation includes determining whether the data is available for being read from the cache, and reading the data if the data is available for being read from the cache.

8. The method as recited in claim 1, and further comprising determining whether the file access pattern is invalid.

9. The method as recited in claim 8, and further comprising deleting the file access pattern if the file access pattern is determined to be invalid.

10. The method as recited in claim 9, and further comprising reading the data and generating a file access pattern associated with the file if the file access pattern is deleted.

11. A computer program product for accelerated scanning, comprising:
(a) computer code for identifying a file access pattern associated with data;
(b) computer code for reading the data based on the file access pattern; and
(c) computer code for performing a virus scan on the data;
wherein the data is read and scanned by executing a first thread of operation for reading the data and a second thread of operation for scanning the data;
wherein the first thread of operation is executed in parallel with the second thread such that, while a first portion of the data is being scanned, a second portion of the data to be scanned is being read and cached, so that, when a scanner is available for scanning the second portion of the data, a delay associated with reading the second portion of the data is avoided;
wherein if it is determined that the data does not have the associated file access pattern, the data is read and the virus scan is performed, and it is determined whether the virus scan is slower than a predetermined amount;
wherein the file access pattern is conditionally generated based on whether the virus scan is slower than the predetermined amount;
wherein the file access pattern is not generated if the virus scan is slower than the predetermined amount in order to save space in a file access pattern database.

12. The computer program product as recited in claim 11, wherein if it is determined that the data does not have the associated file access pattern, the data is read and a file access pattern associated with the file is generated and stored.

13. The computer program product as recited in claim 11, wherein the file access pattern includes a file location.

14. The computer program product as recited in claim 11, wherein the file access pattern includes a data amount.

15. The computer program product as recited in claim 11, wherein the first thread of operation includes retrieving the file access pattern, reading the data based on the file access pattern, and caching the data.

16. The computer program product as recited in claim 15, wherein the second thread of operation includes determining whether the file access pattern is valid, and reading the data from the cache if it is determined that the file access pattern is valid.

17. The computer program product as recited in claim 15, wherein the second thread of operation includes determining whether the data is available for being read from the cache, and reading the data if the data is available for being read from the cache.

18. The computer program product as recited in claim 11, and further comprising computer code for determining whether the file access pattern is invalid.

19. The computer program product as recited in claim 18, and further comprising computer code for deleting the file access pattern if the file access pattern is determined to be invalid.

20. The computer program product as recited in claim 19, and further comprising computer code for reading the data and generating a file access pattern associated with the file if the file access pattern is deleted.

21. A system for accelerated scanning, comprising:
(a) logic for identifying a file access pattern associated with data;
(b) logic for reading the data based on the file access pattern; and
(c) logic for performing a scan on the data;
wherein the data is read and scanned by executing a first thread of operation for reading the data and a second thread of operation for scanning the data;
wherein the first thread of operation is executed in parallel with the second thread such that, while a first portion of the data is being scanned, a second portion of the data to be scanned is being read and cached, so that, when a scanner is available for scanning the second portion of the data, a delay associated with reading the second portion of the data is avoided;
wherein if it is determined that the data does not have the associated file access pattern, the data is read and the scan is performed, after which it is determined whether the scan was slower than a predetermined amount;
wherein the file access pattern is conditionally generated based on whether the scan was slower than the predetermined amount;
wherein the file access pattern is not generated if the scan was slower than the predetermined amount in order to save space in a file access pattern database.

22. A method for reducing delay associated with reading data from memory during a scan, comprising:
(a) initiating a scan;
(b) identifying a file to be scanned during the scan;
(c) determining whether the file has a file access pattern associated therewith;
(d) if it is determined that the file does not have the associated file access pattern,
  (i) reading the data from the file,
  (ii) scanning the data,
  (iii) identifying a file access pattern associated with the file, and
  (iv) storing the file access pattern;
(e) if it is determined that the file has the associated file access pattern, executing a first thread of operation and a second thread of operation, the first thread of operation including:

(i) retrieving the file access pattern,
(ii) identifying a file location and data amount of the file access pattern,
(iii) reading data from the file associated with the identified file location and data amount,
(iv) caching the data, and
(iv) repeating (ii)–(iv); and
(f) said second thread of operation including:
(i) determining whether the file location and data amount are valid,
(ii) deleting at least a portion of the file access pattern associated with the file if it is determined that the file location and data amount are not valid,
(iii) determining whether the data is available for being read from the cache,
(iv) reading the data from the cache if it is determined that the file location and data amount are valid, and the data is available for being read from the cache, and
(v) scanning the data;
wherein the first thread of operation is executed in parallel with the second thread such that, while a first portion of the data is being scanned, a second portion of the data to be scanned is being read and cached, so that, when a scanner is available for scanning the second portion of the data, a delay associated with reading the second portion of the data is avoided;
wherein if it is determined that the data does not have the associated file access pattern, the data is read and the scan is performed, after which it is determined whether the scan was slower than a predetermined amount;
wherein the file access pattern is conditionally generated based on whether the scan was slower than the predetermined amount;
wherein the file access pattern is not generated if the scan was slower than the predetermined amount in order to save space in a file access pattern database.

23. The method as recited in claim 1, wherein the file access pattern is stored in the file access pattern database, each of a plurality of file access patterns located in the file access pattern database being associated with a different set of data.

24. The method as recited in claim 1, wherein the file access pattern includes a checksum of a file path and a file name.

25. The method as recited in claim 1, wherein the data is stored in a cache and the cache is continuously monitored for determining if data is available for scanning.

26. The method as recited in claim 1, wherein the file access pattern is stored in a binary format.

* * * * *